(12) United States Patent
Seo (10) Patent No.: US 6,487,201 B1
(45) Date of Patent: Nov. 26, 2002

(54) METHOD FOR MANAGING RECEIVED DATA IN COMPLEX DIGITAL CELLULAR TERMINAL

(75) Inventor: One-Hyoung Seo, Kwangmyong-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/144,244

(22) Filed: Aug. 31, 1998

(30) Foreign Application Priority Data

Aug. 29, 1997 (KR) .............................. 97-42728

(51) Int. Cl.$^7$ ................................ H04Q 7/20
(52) U.S. Cl. ......................... 370/394; 370/335
(58) Field of Search ................... 455/422, 426, 455/466, 557, 412, 517; 714/748; 370/394, 522, 335, 310, 311, 252, 441, 442, 342, 351, 465, 469, 464, 320, 321, 328, 389, 350

(56) References Cited

U.S. PATENT DOCUMENTS

| | | | | |
|---|---|---|---|---|
| 5,793,744 A | * | 8/1998 | Kanerva | 370/209 |
| 5,878,036 A | * | 3/1999 | Spartz | 370/335 |
| 5,956,651 A | * | 9/1999 | Wilkie | 455/553 |
| 5,963,860 A | * | 10/1999 | Muths | 455/412 |
| 6,057,943 A | * | 5/2000 | Kweon | 455/426 |
| 6,076,181 A | * | 6/2000 | Cheng | 714/748 |
| 6,088,342 A | * | 7/2000 | Cheng | 370/320 |
| 6,111,866 A | * | 8/2000 | Kweon | 370/335 |
| 6,169,732 B1 | * | 1/2001 | Hetherington | 370/335 |
| 6,189,122 B1 | * | 2/2001 | Cheng | 714/748 |
| 6,208,620 B1 | * | 3/2001 | Sen | 370/231 |
| 6,226,301 B1 | * | 5/2001 | Cheng | 370/474 |
| 6,314,101 B1 | * | 11/2001 | Rezaiifar | 370/394 |

* cited by examiner

Primary Examiner—Douglas Olms
Assistant Examiner—Ricardo M. Pizarro
(74) Attorney, Agent, or Firm—Dilworth & Barrese, LLP (57) ABSTRACT

A method for managing received data by a radio link protocol layer for interfacing data between a radio communication terminal and a data processing terminal of a complex digital cellular terminal. Data of a newly received frame is stored in a ring-type frame content buffer in reception order, and the stored frame is managed by a frame control table. If the newly stored frame and a previously stored frame have not successive frame numbers, the newly stored frame is registered in a negative acknowledge control table.

7 Claims, 6 Drawing Sheets

METHOD FOR MANAGING RECEIVED DATA IN COMPLEX DIGITAL CELLULAR TERMINAL

BACKGROUND OF THE INVENTION

1. Field of the Invention

The present invention relates to data services of a complex digital cellular terminal, and more particularly, to a method for managing received data.

2. Description of the Related Art

A complex digital cellular terminal represents a combined radio communication terminal and a data processing terminal. An example of such a complex digital cellular terminal is a a CDMA (Code Division Multiple Access) terminal which can transmit and receive data by radio communication, is combined with a PDA (Personal Digital Assistant) which can manage or process data.

In order to provide a facsimile service or an asynchronous data service, the complex digital cellular terminal should have an interface for transmitting data between a radio communication terminal and a data processing terminal. Namely, there should be a radio link protocol (RLP) layer serving as the interface between an upper point-to-point protocol (PPP) layer corresponding to the data processing terminal and a lower IS95-A layer corresponding to the radio communication terminal.

The RLP layer should satisfy the TIA/EIA IS95-A, TIA/EIA IS-99 and TIA/EIA IS-657 Standards. These Standards are known in the art and therefore no further description will be given.

Figure 1:
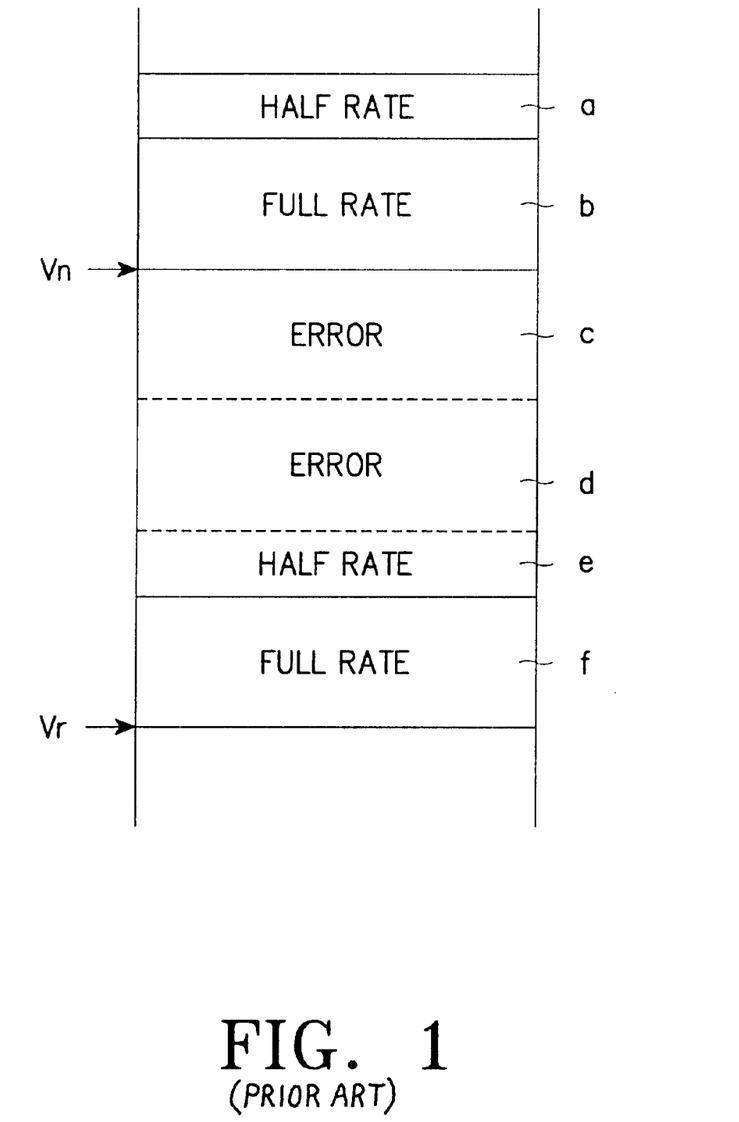
FIG. 1 is a memory map for managing received data according to the prior art.

FIG. 1 shows a memory map for managing a frame with two variable factors, that is, a frame rate and a frame sequence number in the RLP layer. Referring to FIG. 1, a reference symbol Vn denotes a frame sequence number for designating an area in which valid frames which have been sequentially received up to now are stored, and Vr denotes a frame sequence number for designating an area in which the next frame is to be stored. Frame data stored in a buffer has a half frame rate or a full frame rate since the frame rate of the frame data is determined by an RLP frame type.

An example of data bits corresponding to the RLP frame type specified in the TIA/EIA IS-99 Standard is shown in Table 1.

TABLE 1

| RLP Frame Type | Bits per Frame |
| --- | --- |
| Full Rate | 171 |
| Half Rate | 80 |
| Eighth Rate | 16 |
| Blank | 0 |

As indicated in Table 1, the data size (i.e., the frame rate in bits per frame), is determined by the received RLP frame type.

If an error occurs during transmission, the data size of a frame in which an error has occurred cannot be estimated. In such a case, if the frame is processed by a full frame rate of a maximum size in order to satisfy all the frame rates, this is undesirable in that it reduces the efficiency of memory maintenance. More specifically, when a buffer of a specific size is used, it cannot be utilized efficiently.

SUMMARY OF THE INVENTION

It is therefore an object of the present invention to provide a method for managing received data by sequentially storing the received data in reception order irrespective of a frame sequence number.

It is another object of the present invention to provide a method for additionally managing an invalid frame by a negative acknowledge control table.

It is still another object of the present invention to provide a method for deleting a received frame upon receiving an invalid frame which has been previously registered in a negative acknowledge control table.

According to an aspect of the present invention, a method for managing received data by a radio link protocol layer for interfacing data between a radio communication terminal and a data processing terminal of a complex digital cellular terminal, comprises the steps of: storing data of a newly received frame in a ring-type frame content buffer in reception order and managing the stored frame by a frame control table; and registering the newly stored frame in a negative acknowledge control table when the newly stored frame and a previously stored frame do not have successive frame numbers.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described hereinbelow with reference to the accompanying drawings. In the following description, a radio communication terminal and a data processing terminal are referred to as the CDMA and the PDA, respectively.

Figure 2:
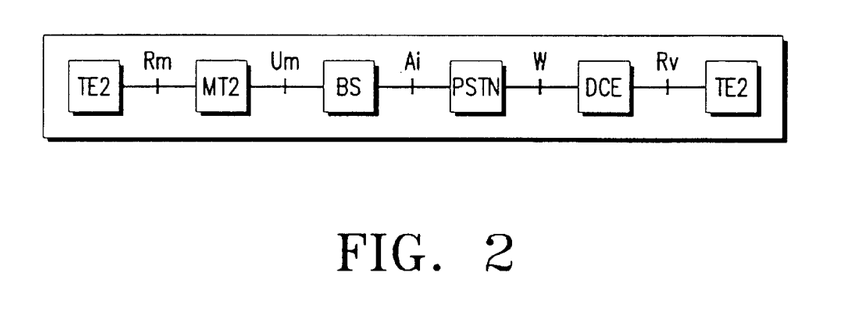
FIG. 2 is a block diagram of a reference model for providing a data service according to an embodiment of the present invention.

FIG. 2 illustrates a reference model proposed by the TIA/EIA IS-99 Standard in order to offer a facsimile function or an asynchronous data service.

Figure 3:
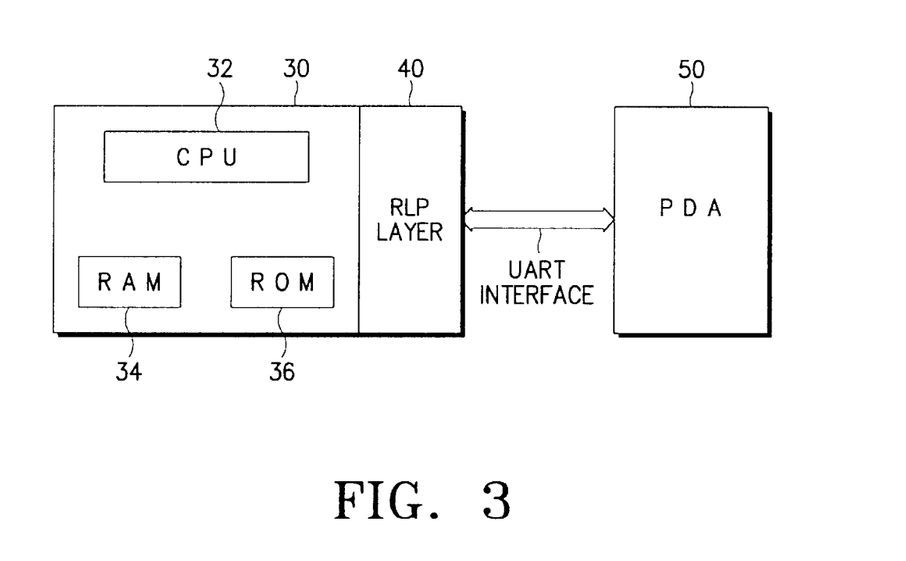
FIG. 3 is a schematic block diagram of a complex digital cellular terminal applied to the present invention.

Referring to FIG. 3, a complex digital cellular terminal includes a CDMA terminal 30 for radio communication, a PDA 50 for processing data, and an RLP layer 40 for interfacing data between the CDMA terminal 30 and the PDA 50. The CDMA terminal 30 has a central processing unit (CPU) 32 for controlling the overall operations of the CDMA terminal 30, a random access memory (RAM) 34, and a read only memory (ROM) 36. An UART (Universal Asynchronous Receiver Transmitter) interface is used between the PDA 50 and the RLP layer 40.

Figure 4:
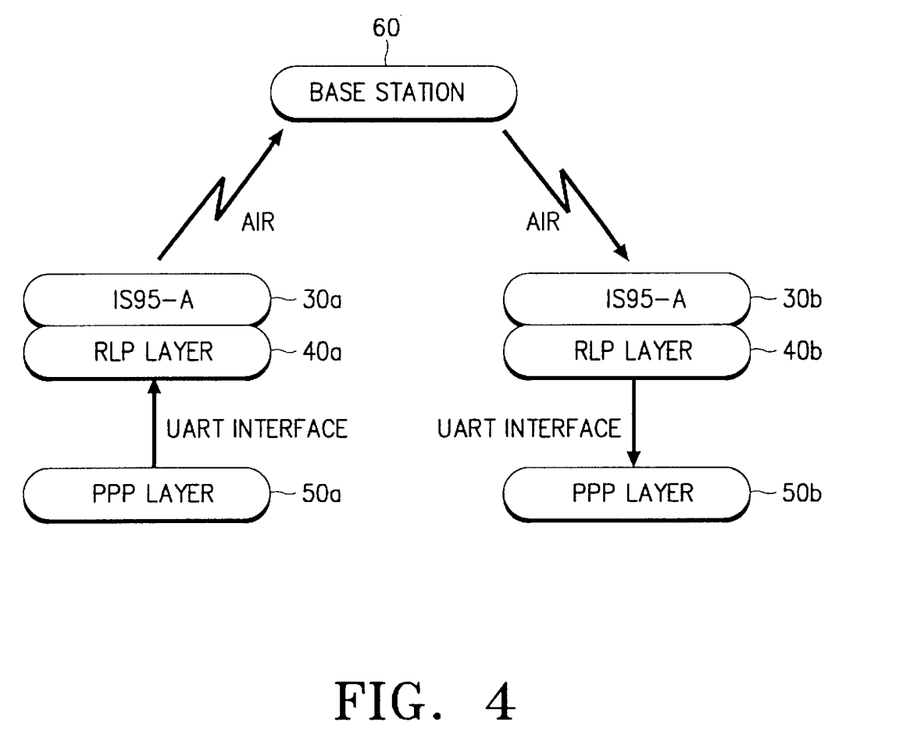
FIG. 4 shows a flow chart illustrating radio communication between complex digital cellular terminals.

FIG. 4 shows a schematic algorithm for radio communication between the complex digital cellular terminals. As shown in FIG. 4, the complex digital cellular terminals in transmission and reception sides are both comprised of IS95-A layers 30a and 30b, RLP layers 40a and 40b, and PPP layers 50a and 50b, respectively. The IS95-A layers 30a and 30b belong to the CDMA terminals, the PPP layers 50a and 50b belong to the PDAs, and the RLP layers 40a and 40b belong to the RLP layers.

The function of the transmitting complex digital cellular terminal will now be described with reference to FIG. 4. PPP data from the PPP layer 50a is supplied to the RLP layer 40a via the UART interface. The RLP layer 40a frames the PPP data according to a framing rule proposed by the TIA/EIA IS-99 Standard in the 20 ms frame unit. The frame data is assembled according to the TIA/EIA IS95-A Standard and then supplied to the IS95-A layer 30a. The IS95-A layer 30a processes the received frame data into an asynchronous serviceable data or facsimile serviceable data on the assumption that a base station 60 and a terminal mode will support a Service Option 4 and a Service Option 5. The processed data is transmitted to the base station 60.

The RLP layers 40a and 40b perform the transmitting and receiving tasks. The RLP layer 40a which performs the transmitting task frames the PPP data from the PPP layer 50a in the 20 ms frame unit and transmits the frame data to the IS95-A layer 30a. In this case, the RLP layer 40a should manage the frames transmitted therethrough for a prescribed time in order to process a negative acknowledge (NAK) frame transmitted from a destination terminal or the base station. Similarly, the RLP layer 40b which performs the receiving task assembles the frame from the IS95-A layer 30b into the PPP data and transmits the PPP data to the PPP layer 50b. In this case, the RLP layer 40b should confirm a frame sequence number and a frame check sequence (FCS). If there is a frame which is not normally received, the RLP layer 40b should transmit a NAK RLP frame to a destination terminal so as to re-receive that frame.

Figure 5:
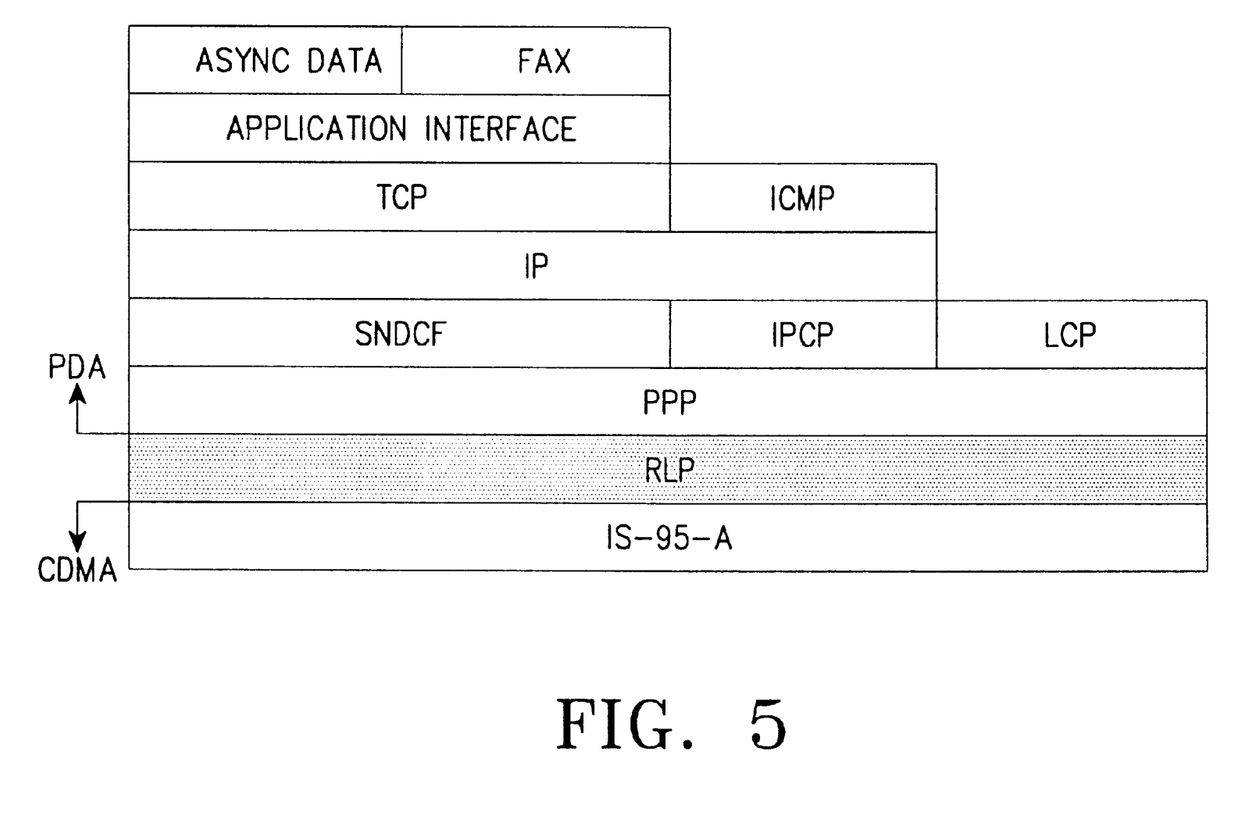
FIG. 5 shows a stack structure of the Um protocol of a complex digital cellular terminal.

FIG. 5 shows a stack structure of an actual Um protocol of the complex digital cellular terminal.

Figure 6:
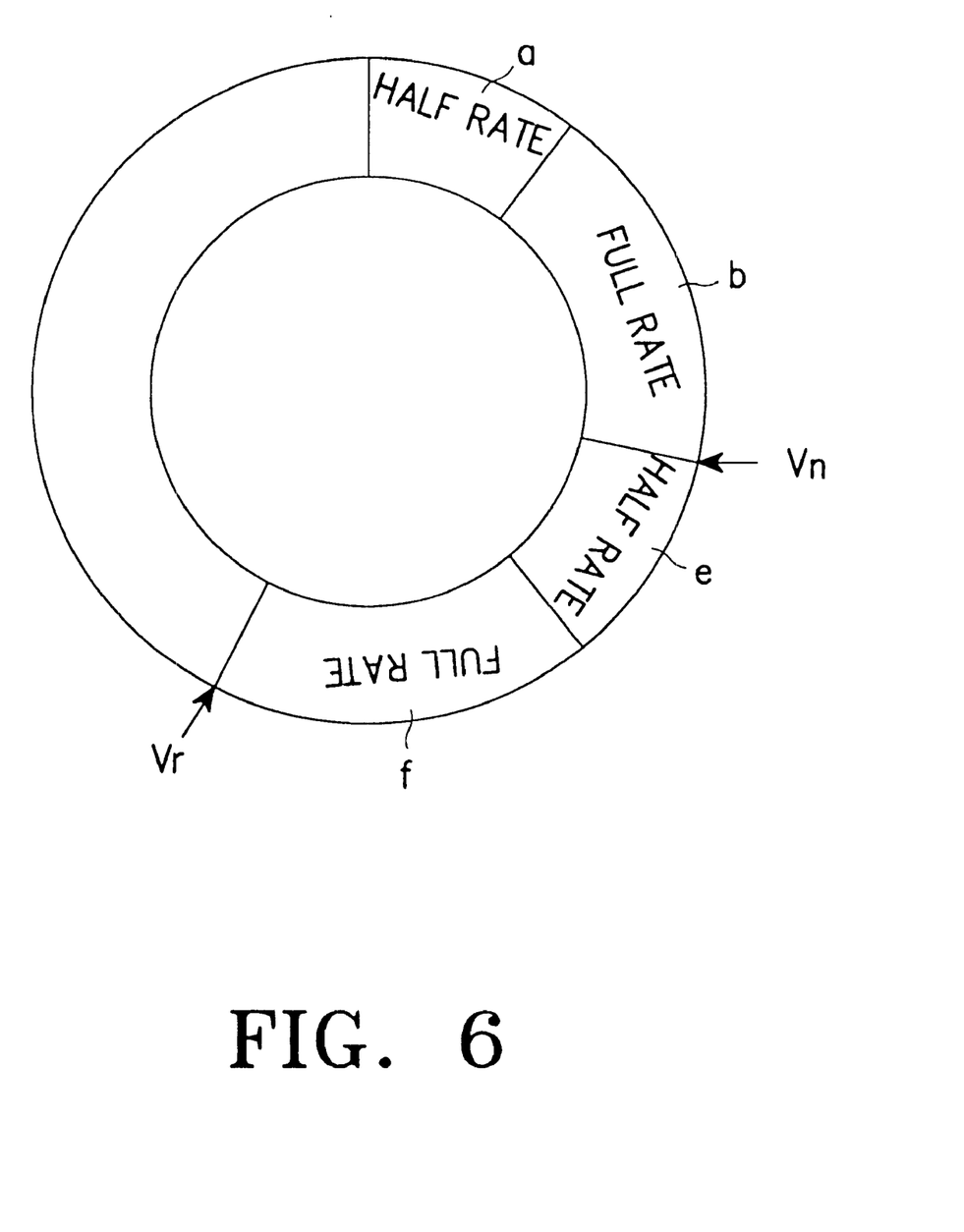
FIG. 6 is a memory map for managing received data according to a preferred embodiment of the present invention.

FIG. 6 is a memory map for managing received data. The memory map has a circular ring buffer structure.

Figure 7:
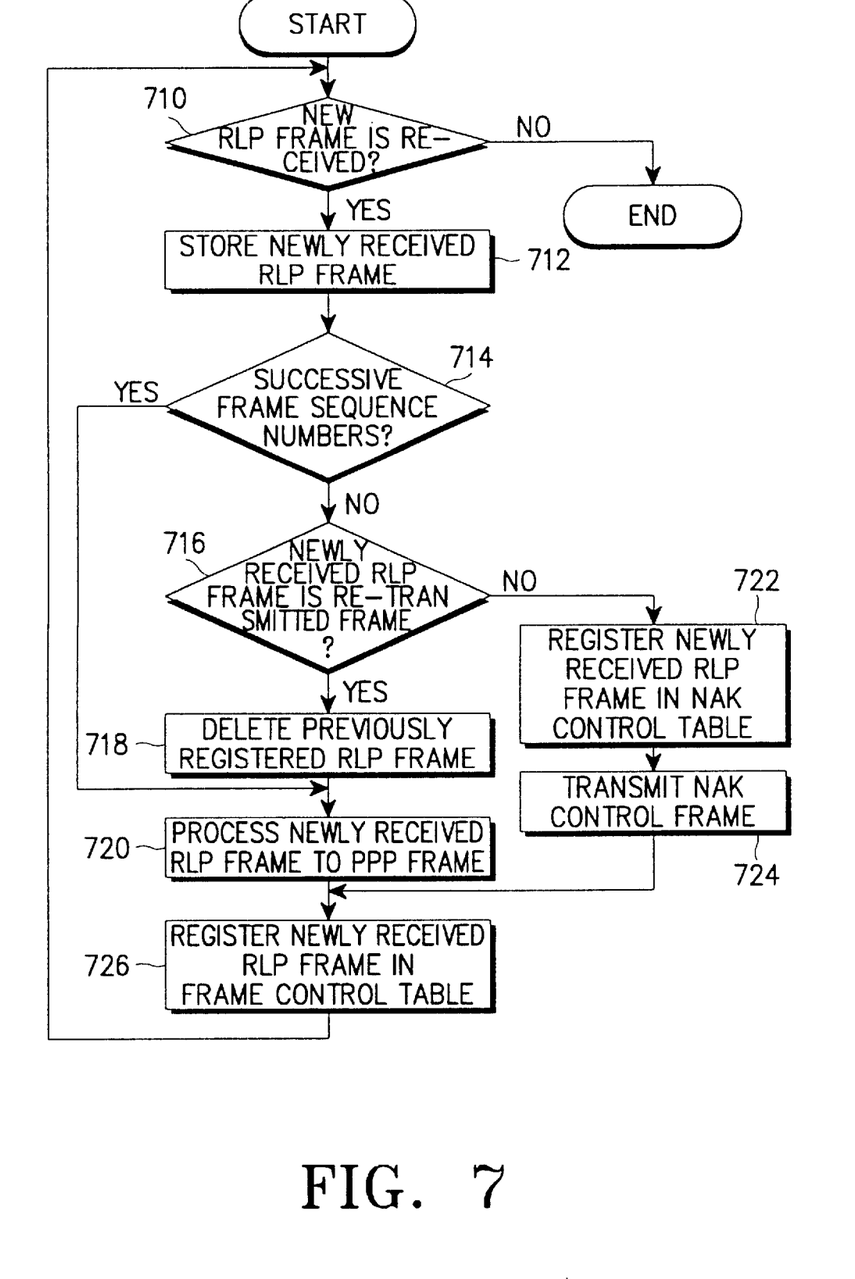
FIG. 7 is a flow chart showing a control process for managing received data according to a preferred embodiment of the present invention.

FIG. 7 is a flow chart showing a control process for managing received data.

First, a data managing operation in the case where RLP frames are received in sequence will now be described. The RLP layer 40 checks whether a new RLP frame is received through the IS95-A layer of the CDMA terminal 30 (step 710). The RLP frame is a frame re-assembled from the IS95-A frame received through air from the base station 60 so as to be processed in the RLP layer 40 through the IS95-A layers 30a and 30b of the CDMA terminal 30.

Upon receiving the RLP frame, the RLP layer 40 stores the newly received RLP frame in a frame content buffer in reception order irrespective of the frame sequence number (step 712). The frame content buffer has a circular ring buffer structure as shown in FIG. 6 so that received RLP frames can be stacked irrespective of the frame sequence number or the frame rate. The frames stacked in the frame content buffer are additionally managed by a frame control table.

The RLP layer 40 then checks whether the newly received RLP and the previously received RLP frame have successive frame sequence numbers (step 714). If they have successive frame sequence numbers, the newly received RLP frame is processed to a PPP frame and transmitted to the PDA 50 through the UART interface (step 720). Thereafter, the RLP layer 40 registers the RLP frame in the frame control table (step 726). The frame control table also has the circular buffer structure.

The frame control table is constructed as shown in Table 2.

TABLE 2

| Frame Control Table [ ] | Sequence_Number |
| --- | --- |
| | Frame_OK_flag |
| | NAK_frame_number |
| | Start_Offset |
| | End_Offset |

In Table 2, Sequence_Number is a sequence number of a currently received frame; Frame_OK$_{13}$ flag is a flag for indicating whether the currently received frame is a valid frame or an invalid frame; NAK$_{13}$ frame_number is a sequence number assigned when a NAK control frame occurs; Start_Offset is a start address of the frame content buffer in which the currently received frame is stored; and End_Offset is an end address of the frame content buffer in which the currently received frame is stored.

The RLP layer 40 generates the frame control table indicated in Table 2 and registers the received RLP frame in the frame control table (step 726). Thereafter, the RLP layer 40 goes back to step 710 to see if a new RLP frame is received.

The data managing operation in the case where the newly received RLP and the previously received RLP frame have not successive frame sequence numbers will now be described. The RLP layer 40 stores the newly received RLP frame in the frame content buffer (step 712). Since the newly received RLP frame and the previously received RLP frame does not have successive frame sequence numbers (step 714), the RLP layer 40 checks whether the newly received RLP frame is a frame previously registered in a NAK control table (step 716). If the newly received RLP frame is a frame previously registered in the NAK control table, this means that the newly received RLP frame is a re-transmitted RLP frame. If not, this indicates that the newly received RLP frame is not valid.

If the received RLP frame is judged to be a retransmitted frame (step 716), the RLP layer 40 proceeds to step 718 where the previously registered RLP frame is deleted. If it is analyzed that there is an error in transmission, the RLP layer 40 advances (step 722). The RLP layer 40 registers the received RLP frame in the NAK control table at step 722, and transmits a NAK control RLP frame (step 724).

An example of the NAK control table is shown in Table 3.

TABLE 3

| NAK Control Table [ ] | NAK_counter |
| --- | --- |
| | First_SEQ_NUM |
| | Last_SEQ_NUM |

In Table 3, NAK_counter is the number of times that a NAK timer has expired; First_SEQ_NUM is a sequence number of the first frame of successive frames to be negatively acknowledged; and Last_SEQ_NUM is a sequence number of the last frame of successive frames to be negatively acknowledged.

If the NAK control RLP frame has been transmitted, the RLP layer 40 makes the frame control table as indicated in Table 1 and registers the received RLP in the frame control table at step 726. Thereafter, the RLP layer returns to step 710 to see if a new RLP frame is received.

Meanwhile, If it is analyzed that the newly-received RLP frame is a re-transmitted frame at step 716, the RLP layer 40 deletes the previously registered RLP frame from the NAK control table at step 718. The received RLP frame is then processed into the PPP frame and transmitted to the PDA 50 through the UART interface (step 720). Thereafter, the RLP layer 40 generates the frame control table and registers the received RLP frame in the frame control table at step 726. If the received RLP frame has been registered, it is checked at step 710 whether a new RLP frame is received. If no new RLP frame is received, the control process is ended.

That is, if a valid RLP frame is received, the received RLP frame is processed into the PPP frame and transmitted to the PDA 50. The NAK control RLP frame transmitted when an invalid RLP frame is received uses a frame form specified by the TIA/EIA IS-99 Standard. Moreover, the received RLP frame uses a frame form specified by the TIA/EIA IS-99 Standard including an RLP frame sequence number area, an RLP frame type area and a data area.

The data managing operation in the case where the RLP frame shown in FIG. 6 is stored in the frame content buffer will now be described.

If an RLP frame "a" with a half frame rate is received, the RLP layer 40 stores the received RLP frame "a" in the frame content buffer. The received RLP frame "a" is then processed into the PPP frame. The processed frame is transmitted to the PDA 50 and registered in the frame control table shown in Table 2. In the frame control table, there are registered the frame sequence number of the RLP frame "a", the flag indicating that the RLP frame is a valid frame, and the start address and end address of the frame content buffer in which the RLP frame "a" is stored.

If an RLP frame "b" with a full frame rate is received, the received RLP frame "b" is registered through the same process as the case where the RLP frame "a" is received. If an RLP frame "e" following the RLP frame "b" is received, the RLP frame "e" is registered in the NAK control table indicated in Table 3. The frame sequence number of the first RLP frame "c" and the frame sequence number of the last RLP frame "d" (FIG. 1) which are to be negatively acknowledged are registered in the NAK control table.

Although not shown in FIG. 6, if an RLP frame "c" is received after the RLP frame "f" with a full frame rate is received, the RLP layer 40 deletes the RLP frame "c" registered in the NAK control table.

As described above, even if the received data has a variable size and its frame number is irregular, the frame data is stacked in the buffer in reception order and managed by using the control table. Therefore, the present invention may be effective in using a memory of a device having limited resources such as a terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for managing received data by a radio link protocol layer for interfacing the received data between a radio communication terminal and a data processing terminal of a complex digital cellular terminal, said method comprising the steps of:

storing data of a newly received frame in a frame content buffer in reception order irrespective of a frame number associated with said newly received frame and managing the stored frame by a frame control table; and registering the newly stored frame in a negative acknowledge control table, when the newly stored frame and a previously stored frame do not have successive frame numbers, wherein registered in said frame control table is a start address of said frame content buffer, an end address of said frame content buffer, a sequence number, and one of a valid and invalid flag.

2. The method as claimed in claim 1, further comprising the step of deleting a previously registered frame from said negative acknowledge control table when the newly stored frame and the previously stored frame do not have successive frame numbers and the newly stored frame has been previously registered in said negative acknowledge control table.

3. A method for managing received data by a radio link protocol layer for interfacing the received data between a radio communication terminal and a data processing terminal of a complex digital cellular terminal, said method comprising the steps of:

sequentially storing data of a newly received frame in a frame content buffer;

transmitting a valid control frame when the newly received frame and a previously received frame have successive frame sequence numbers;

registering the newly received frame in a negative acknowledge control table and transmitting a negative acknowledge control frame when the newly received frame and the previously received frame do not have successive frame sequence numbers, and the newly received frame is a frame which is not managed by said negative acknowledge control table;

deleting a previously registered frame from said negative acknowledge control table and transmitting said valid control frame when the newly received frame and the previously received frame do not have successive frame sequence numbers and the newly received frame is a frame managed by said negative acknowledge control table; and registering the received frame in a frame control table.

4. The method as claimed in claim 3, wherein said step of registering the received frame in a frame control table further comprises registering a start address and an end address of said frame content buffer, a sequence number, and a valid or invalid flag in said frame control table.

5. The method as claimed in claim 3, wherein said step of registering in the negative acknowledge control table further comprises registering a sequence number of first frame and a sequence number of a last frame among frames which are not successively received between the newly received frame and the previously received frame in said negative acknowledge control table.

6. An apparatus for managing received data by a radio link protocol layer for interfacing the received data between a radio communication terminal and a data processing terminal of a complex digital cellular terminal, said apparatus comprising:

means for storing data of a newly received frame in a frame content buffer in reception order irrespective of a frame sequence number associated with said newly received frame;

means for managing the stored frame using a frame control table; and means for registering the newly stored frame in a negative acknowledge control table, wherein registered in said frame control table is a start address of said frame content buffer, an end address of said frame content buffer, a sequence number, and one of a valid and invalid flag.

7. The apparatus as claimed in claim 6, further comprising:

means for deleting a previously registered frame from the negative acknowledge control table when the newly stored frame and the previously stored frame do not have successive frame numbers and the newly stored frame has been previously registered in the negative acknowledge control table.

* * * * *